(12) United States Patent
Dokonal et al.

(10) Patent No.: US 6,380,654 B1
(45) Date of Patent: Apr. 30, 2002

(54) PROCESS FOR MAGNETIZING THE PERMANENT MAGNETS OF AN ELECTRIC MOTOR ROTOR AND A PROCESS FOR ASSEMBLING A HERMETIC COMPRESSOR MOTOR

(75) Inventors: Luiz Von Dokonal; Marcos Guilherme Schwarz; Marcos Romeu Möbius, all of Joinville-SC (BR)

(73) Assignee: Empresa Brasileira de Compressores S.A. -Embraco, Joinville-SC (BR)

( * ) Notice: Subject to any disclaimer, the term of this patent is extended or adjusted under 35 U.S.C. 154(b) by 0 days.

(21) Appl. No.: 09/509,495

(22) PCT Filed: Dec. 16, 1998

(86) PCT No.: PCT/BR98/00114

§ 371 Date: Mar. 27, 2000

§ 102(e) Date: Mar. 27, 2000

(87) PCT Pub. No.: WO99/35729

PCT Pub. Date: Jul. 15, 1999

(30) Foreign Application Priority Data

Dec. 29, 1997 (BR) .............................................. 9706334

(51) Int. Cl.$^7$ .......................... H02K 21/24; H02K 21/12
(52) U.S. Cl. ............................ 310/156.53; 310/156.56; 310/269; 29/596; 29/598
(58) Field of Search .................................. 310/156, 165, 310/168, 162, 166; 318/138, 254, 439, 701; 29/596–598

(56) References Cited

U.S. PATENT DOCUMENTS

| | | | |
|---|---|---|---|
| 4,748,535 A | | 5/1988 | Arawaka et al. |
| 4,994,720 A | * | 2/1991 | Cott ............................. 318/254 |
| 5,424,902 A | | 6/1995 | Shida et al. |
| 5,929,547 A | * | 7/1999 | Kim ............................. 310/156 |
| 5,945,760 A | * | 8/1999 | Honda et al. ................ 310/156 |
| 5,973,431 A | * | 10/1999 | Li et al. ...................... 310/168 |
| 6,127,764 A | * | 10/2000 | Torok .......................... 310/269 |

FOREIGN PATENT DOCUMENTS

| | | | |
|---|---|---|---|
| EP | 0 800 257 | 10/1997 | .......... H02K/15/03 |
| WO | Wo 97/13311 | 4/1997 | ............ H02K/1/27 |

* cited by examiner

*Primary Examiner*—Tran Nguyen
(74) *Attorney, Agent, or Firm*—Darby & Darby

(57) ABSTRACT

A process for magnetizing the permanent magnets of an electric motor rotor and a process for assembling a hermetic compressor motor, whose stator (30) carries a plurality of coils (40), said rotor being operationally positioned with a determined relative angular position in relation to the stator (30) prior to the energization, from an external current source, of a determined number of coils (40) of said stator (30) with a current pulse having a required intensity to generate a magnetic field which produces a homogeneous magnetization transversely oriented in at least one magnetic sector, said current pulse being maintained during a shorter time than that which impairs the coils of said stator (30).

15 Claims, 3 Drawing Sheets

PROCESS FOR MAGNETIZING THE PERMANENT MAGNETS OF AN ELECTRIC MOTOR ROTOR AND A PROCESS FOR ASSEMBLING A HERMETIC COMPRESSOR MOTOR

FIELD OF THE INVENTION

The present invention refers to a process for magnetizing the magnets mounted to the metallic core of a brushless electric motor rotor and, more particularly, to a process for assembling the motor of a hermetic compressor.

BACKGROUND OF THE INVENTION

Motors with permanent magnets in the rotor have been largely used in industrial applications and in household equipments, particularly electric appliances, consisting in the preferred solution for hermetic compressors of variable capacity.

These electric motors have permanent magnets usually in the form of arcuated plates retained to a cylindrical rotor core (usually in laminated or massive iron) mounted around the motor shaft. In these rotors, the magnets may be disposed in housings defined by longitudinal openings inside the metallic core, or maintained seated on the cylindrical lateral surface of said core, through different retaining means designed to impart to the mechanical structure the required resistance to the rotational and operational forces of the motor.

Since the equipments are produced on a large scale, the manufacturing process of these motors requires specific cares to avoid contamination with metallic particles, as well as handling cares.

In the known prior art, the magnets are individually magnetized before they are mounted to the rotor, or they are mounted to said rotor and magnetized afterwards, before the rotor is mounted to the electric assembly or equipment to which it will be applied.

The magnetization of a magnet for its posterior utilization in a magnetic device, whichever the conception thereof, is effected by applying to the virgin magnet a magnetizing field which is usually larger than the coercitive field (Hc) of said magnet.

This magnetizing field should have flux lines in the desired direction of magnet magnetization, since the magnetic field acquired by the magnet after magnetized will have flux lines in the same direction of the field which generated said magnetization.

The magnetizing field is usually obtained by applying a current pulse of high intensity and short duration to a ferromagnetic structure containing a coil, or a group of coils, in order to generate a magnetic field which, on its turn, magnetizes the magnet.

In certain electromagnetic devices, as for example the motors with permanent magnets in the rotor and used in hermetic compressors of variable capacity, the magnetic fields generated by the electric currents are very similar, in shape, to the optimum desired magnetic field in the magnet. The flux lines of the magnetic field generated by the currents have the same direction and orientation as the optimum magnetic field of the magnets. The difference lies on the fact that the amplitude of the field generated by the currents under operation is much lower than that required to magnetize the magnets.

However, it is possible to increase the current instantaneously, until the field reaches high values in short time intervals, without damaging the stator.

One of the consequences resulting from magnetizing the magnets in the way it is presently effected is related to the potential of magnetic attraction of said magnets onto solid particles during handling, transportation or storage of the rotor, before the latter is assembled to the equipment to which it is designed.

This magnetic attraction may also act in relation to the adjacent parts, whether they are magnetized or not, of the product to which said magnets are designed, and to those parts provided during the magnetizing process of said magnets, with the risk of mechanical impact and damage to the product.

These occurrences may impair the operation of the equipment, reducing its useful life and even damaging its structure or the magnets, either at the instant of an accidental impact or at the beginning of the operation.

For the hermetic compressor motors, particularly those of variable capacity, the problems resulting from the presence of loose solid particles inside the compressor are particularly relevant and may impair the useful life of the compressor, as well as the operational capacity thereof.

The loose solid particles attracted by the magnets, already magnetized when the rotor was assembled to the compressor, during the operation of said compressor collide with the bearing and the piston-cylinder unit, producing new loose particles which provoke wear in the bearing.

The loose solid particles inside the compressor reach the oil sump and, besides being conducted to all parts lubricated by the lubricant oil in the compressor (motor, compressor inside) and colliding, for example, with the bearing and piston-cylinder unit, are also conducted, together with the refrigerant gas, to the refrigeration circuit to which the compressor is associated, resulting in the partial or total obstruction of the capillary tube of the refrigeration system, impairing the refrigeration efficiency of said system and, depending on the obstruction degree, impairing the refrigeration operation of the compressor. Another disadvantage of the prior art of magnet magnetization for electric motor rotors of hermetic compressors relates to the consequences resulting from the disalignment of the magnetic fields of both the rotor and stator, which commonly occurs in this technique.

When the assembly of the eccentric shaft-rotor unit (the rotor carrying the already magnetized permanent magnets) to the stator does not provide an alignment of the rotor end faces in relation to the stator end faces, a disalignment occurs between the respective magnetic fields, originating a system of forces acting on the bearing and conducting to an operational unbalance of the eccentric shaft in the cylinder block and, consequently, between the piston and cylinder where said shaft operates, causing wear in said parts and also operational inefficiency of the compressor.

Besides these problems, the technique employed nowadays requires a specific equipment for generating and applying the magnetizing field to the magnets mounted to the rotor, but before said rotor is mounted to the motor assembly of the compressor.

DISCLOSURE OF THE INVENTION

Thus, it is a general objective of the present invention to provide a process for magnetizing the permanent magnets of an electric motor rotor, which eliminates the possibility of occurring magnetic attraction of the rotor magnets onto particles or adjacent parts of said magnets during handling, transportation and storage of said rotor, before the latter is mounted to the motor or equipment to which it is designed, as well as during the assembly operations of the rotor to the equipment.

Another objective of the present invention is to provide a process for magnetizing the rotor magnets, which does not require specific equipments for obtaining the magnetization of the rotor magnets.

A specific objective of the present invention is to provide a process for magnetizing the rotor magnets, which utilizes the motor structure with the rotor already mounted inside the stator.

A further objective of the present invention is to provide a process for magnetizing the magnets of an electric motor rotor for a hermetic compressor which, besides the advantages above, minimizes the presence of loose particles inside the compressor and the consequences related to the wear of the component parts thereof and to the obstruction of the capillary tube of the refrigeration system to which said compressor is associated.

These and other objectives are attained by a process for magnetizing the permanent magnets of an electric motor rotor, having rotor magnetic sectors, each with a single and respective magnetic orientation and comprising at least one magnet, and whose stator carries a plurality of coils, said process comprising the steps of: a- assembling the electric motor, by operationally positioning the rotor in relation to the stator; and b- promoting the controlled energization, from an external current source, of at least one coil of the stator, in order to promote the magnetization of the magnetic sectors.

BRIEF DESCRIPTION OF THE DRAWINGS

The invention will be described below, with reference to the attached drawings, in which.

BEST MODE OF CARRYING OUT THE INVENTION

Figure 2:
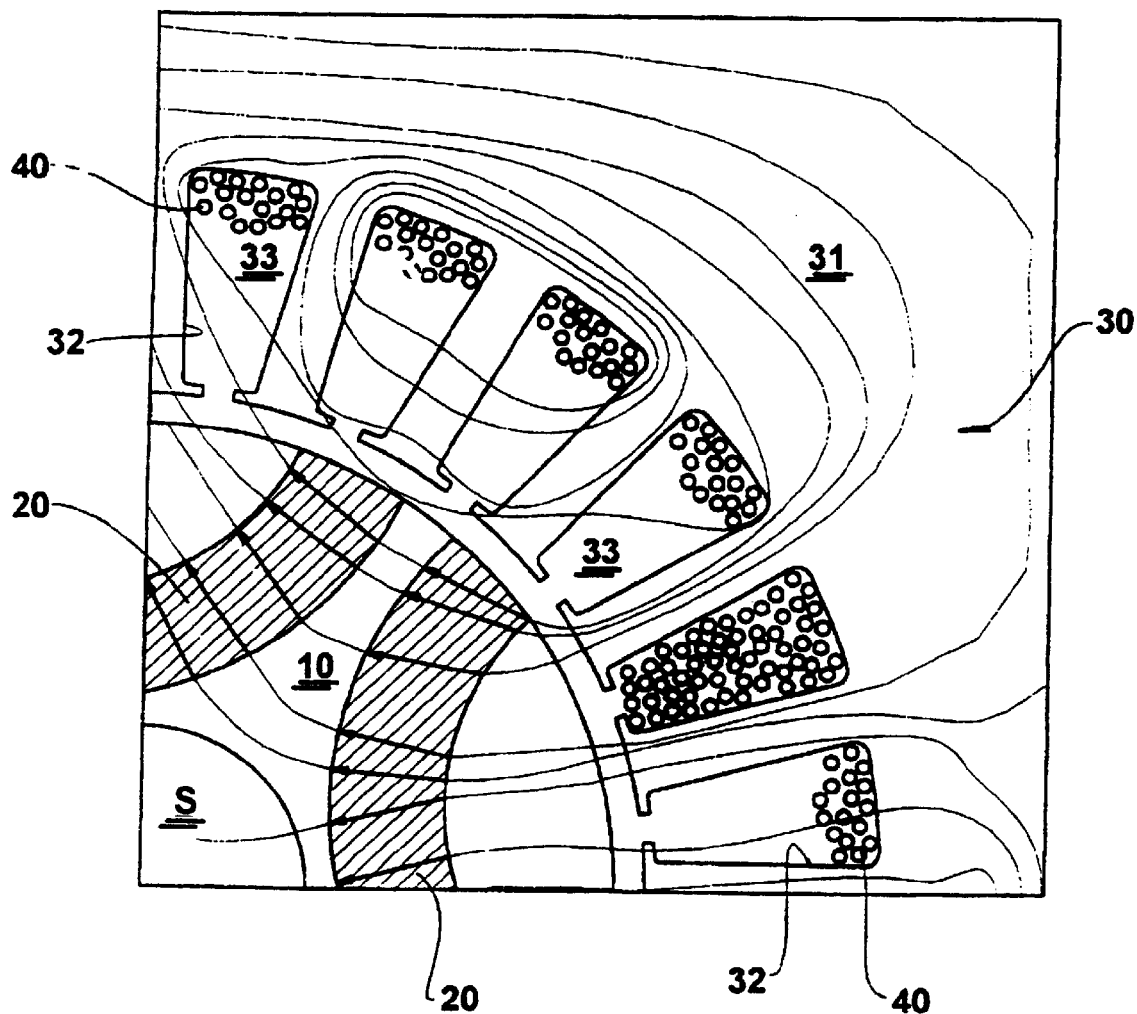
FIG. 2 illustrates, as in FIG. 1, another rotor construction having arcuated magnets provided inside the rotor.
Figure 3:
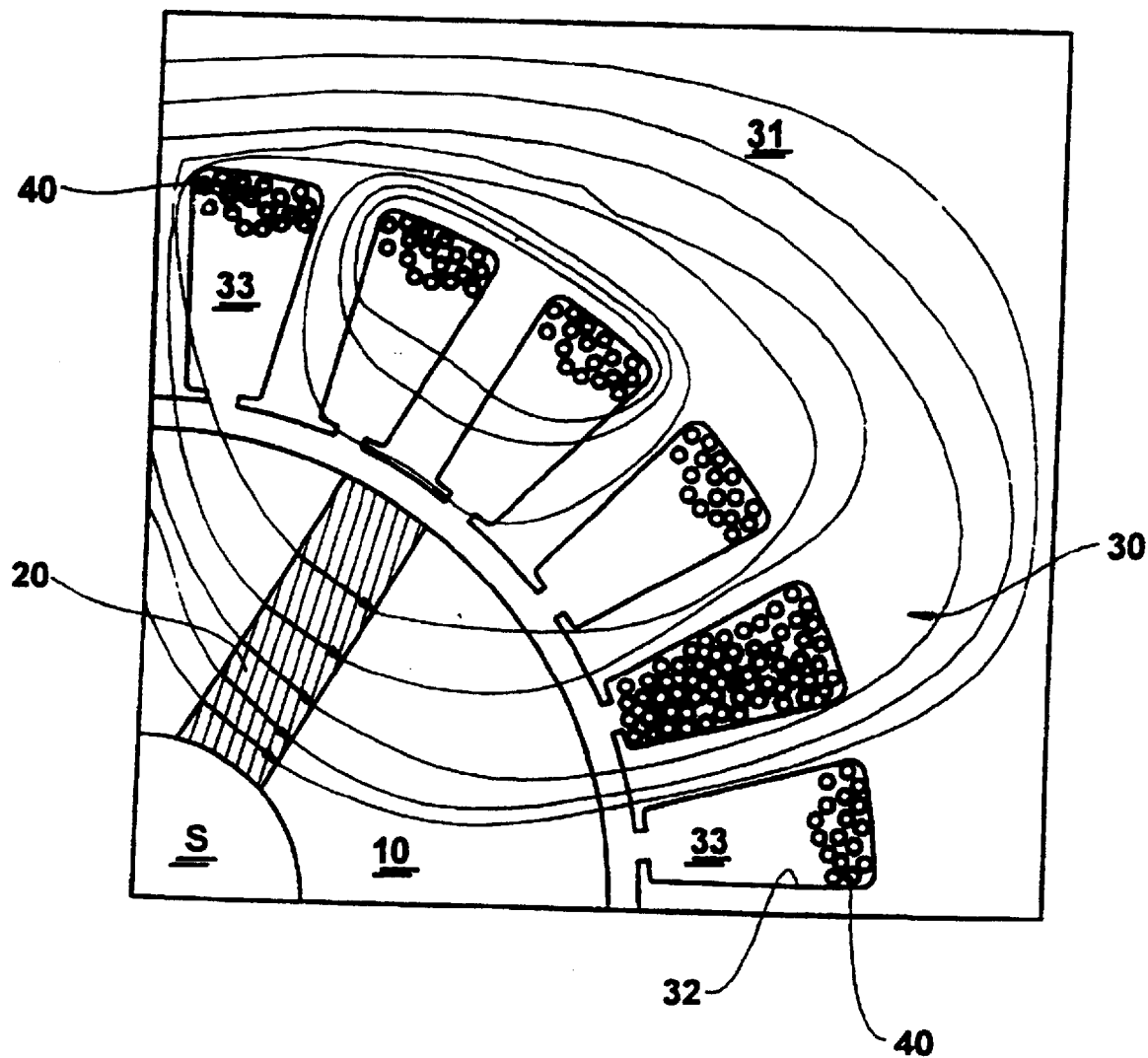
FIG. 3 illustrates, as in FIG. 1, another rotor construction having rectilinear magnets provided internally to the rotor.

The present invention refers to the magnetization of a brushless electric motor rotor, having a core 10, which is to be affixed around an extension of a shaft S of the motor and which carries magnets 20. The electric motor has rotor magnetic sectors, each with a single and respective magnetic orientation and comprising at least one magnet 20, said magnets 20 being, for instance, made of strontium ferrite in the form of arcuated plates, which are adequately circumferentially seated and retained onto an external surface of the core 10, such as illustrated in FIG. 1, or the magnets may be provided inside the core, as illustrated in FIGS. 2 and 3.

Figure 1:
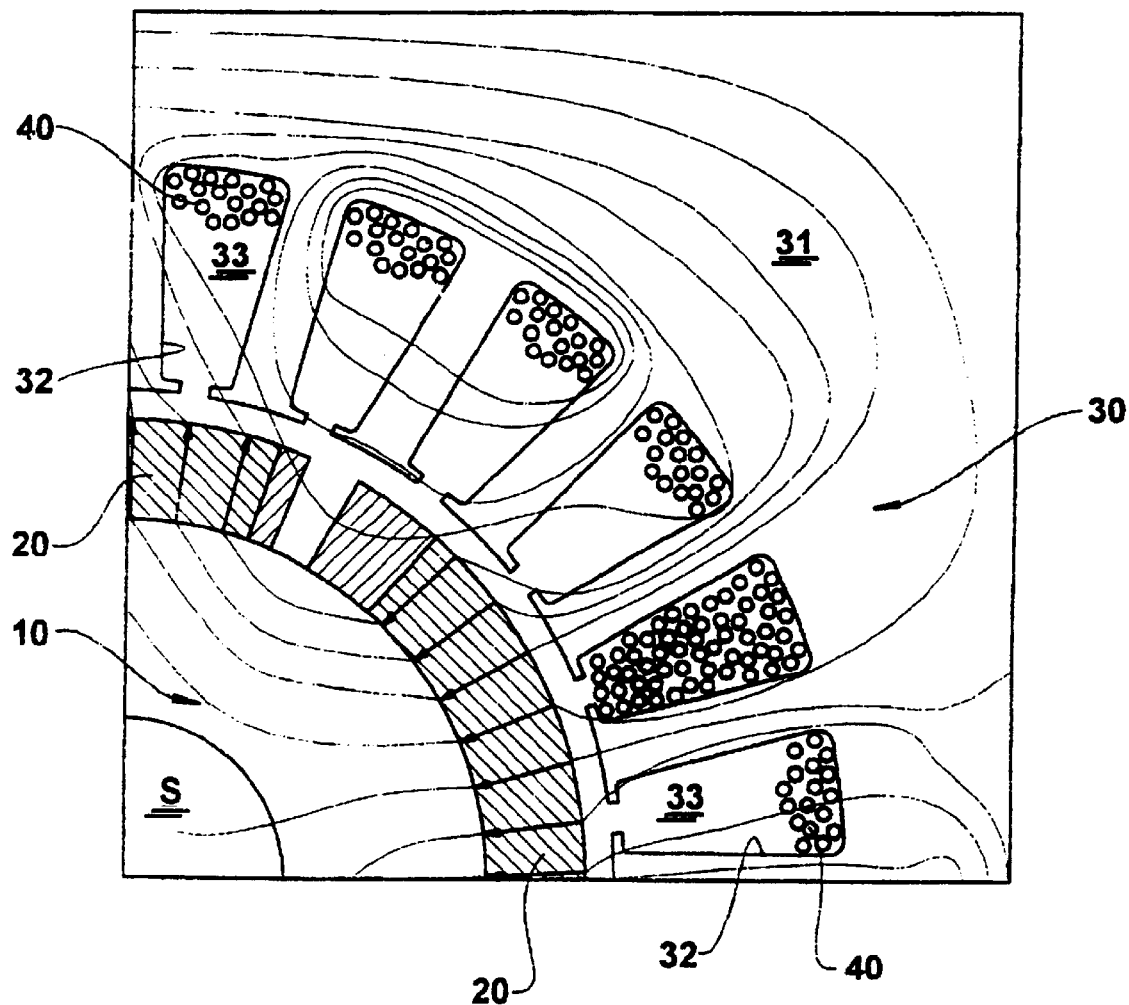
FIG. 1 illustrates schematically, partially and in a cross-sectional view, a construction of an electric motor rotor mounted inside the stator lamination stack of said rotor and having arcuated magnets provided on the external surface of the rotor.

In the construction illustrated in FIG. 1, the rotor is mounted inside a stator 30, with an adequate air gap. The stator 30 is formed by an axial alignment of a plurality of metallic laminations 31, which are mutually concentric and overlapped, forming a stator lamination stack.

Each metallic lamination 31 has a plurality of grooves 32 opened to the radially internal edge of the respective metallic lamination 31 and which are angularly and circumferentially spaced from each other.

The overlapping of the metallic laminations 31, in order to form the stator lamination stack, occurs so that the grooves 32 of each metallic lamination 31 are aligned with respective grooves 32 of the other metallic laminations 31 of the stator lamination stack, defining axial housings 33, each receiving a respective plurality of coils 40.

According to the present invention, the magnetization of the rotor occurs after mounting the latter to the stator 30 of the motor (or another equipment with which it will operate) using, as a means for applying the magnetic field to the magnets, the winding and the metallic structure of the stator 30. The magnetization occurs with the controlled energization of at least one coil 40 previously selected for this purpose.

According to the present invention, in order to magnetize the magnets 20 mounted to the rotor core, each coil 40 connected to an external current source is energized with at least one current pulse of high intensity and short duration, for instance during a time interval between 1 and 20 ms for ferrite magnets, which is able to generate an instantaneous magnetic field with sufficient intensity to induce a desired magnetization of at least a substantial portion of at least one magnetic sector, said magnetic field producing a homogeneous magnetization with field lines which are transversely oriented in relation to at least one magnetic sector.

The generated magnetic field should guarantee the magnetization of at least a large extension, of for example at least one magnetic sector, said current pulse having an intensity higher than that of the operational current of the motor and required to generate a magnetic field which produces a homogeneous magnetization and according to field lines transversely oriented in each magnetic sector.

For magnets 20 which have, for instance, an arcuated form and which are provided externally to the core, the field lines should be radially oriented.

The duration of application of each current pulse with the intensity of magnetization should be lower than that which impairs the coils 40 of the stator 30, in order to avoid, for example, the undue heating of said coils.

According to the present invention, the individual and sequential energization of each coil 40 or the simultaneous energization of a number of coils 40 is effected after the rotor is rotatively affixed in a determined angular position in relation to the number of coils 40 of stator 30 to be energized, said position being previously determined so that a minimum number of current pulses, preferable a single current pulse, generates an instantaneous magnetic field, maximizing the characteristics of magnetization (direction of magnetization, homogeneity and intensity of magnetization) for at least one magnetic sector and, preferably, simultaneously for all the magnetic sectors of the motor.

The determination of a specific positioning of magnets 20 with relation to the axial housings 33 containing coils 40 of the stator 30 is required, in order to allow each magnet 20 to be adequately magnetized, i.e., to have a minimum of regions with deficient magnetization with, for example a single current pulse, said regions, it they exist, being at the end of the process close to each of the lateral edges of each magnetic sector of the rotor.

An adequate magnetization is achieved when the field lines in each magnetic sector have characteristics of homogeneity and radial orientation, the adjacent magnetic sectors of the rotor having magnetic field lines radially oriented in opposite directions.

The number of magnetic sectors of a rotor is defined as a function of the design characteristics of the motor, each magnetic sector having a single and respective magnetization direction, different from that presented by an adjacent magnetic sector, each magnetic sector of the rotor being determined during the magnetizing process and comprising at least one magnet 20.

An inadequate positioning of the rotor in relation to the coils of the stator 30 to be energized allows the magnetic field generated by the current passing through said coils 40 to present at least part of its magnetic field lines, which are crossing a rotor magnetic sector, inclined in relation to a perpendicular line and to a plane tangent to the external surface of the magnet 20 at the region of incidence of said magnetic flux line, thus generating the deficient magnetization regions, as illustrated in FIG. 1 (with a differentiated hachure) at the lateral edge portions of two adjacent magnetic sectors. In the illustrated situation, the deficient magnetization regions result from the angularly displaced positioning of the magnets 20 in relation to the coils 40 of stator 30 which are being energized. In this disposition, the lateral edge portions of said magnets 20 are positioned aligned with the field lines angularly oriented in relation to the radius of the magnets 20.

After the rotor with the non-magnetized magnets 20 has been mounted to the motor, said rotor is positioned at a determined preferred angle in relation to said motor stator 30, this angle being for example the one defined between the ends or magnetic center of a magnet 20 and an axial housing 33 of the stator 30, whose coils 40 will be energized for generating the magnetic field. Then, the rotor has to be steadily kept in this position, by using a temporary retaining means, for example.

The selection of the coil or coils 40 of stator 30, onto which the external current source applies the current pulse, depends on the type of motor, number of poles, number of stator grooves, shape of the magnets 20, etc.

The current source may also apply other subsequent current pulses in a number sufficient for obtaining the complete magnetization of at least one magnetic sector or various magnetic sectors, simultaneously, or also providing a determined number of current pulses required to produce said complete magnetization corresponding to the number of magnetic sectors to be magnetized. The magnetization of at least a substantial part of at least one magnetic sector, or each of the magnetic sectors, may be also achieved by applying simultaneous or consecutive current pulses, each produced by at least one respective coil 40 of stator 30.

According to the present invention, in case the magnetization obtained in a previous stage has not encompassed the whole volume of all magnets 20 of the rotor or, for instance, as illustrated, when the field generated by the coils of the stator 30 has a correct direction and orientation, but with some portions of the magnetic sectors being found with an inadequate or poor magnetization, other current pulses may be applied after each modification of relative angular position between each magnetic sector, which will have the magnetization of its magnets 20 completed, and the assembly of at least one coil to be energized.

The amount of pulses generated and applied to the rotor depends, for example, on determining the positioning of the magnets in relation to the rotor, the determination of the positioning being defined in order to minimize the number of process steps, i.e., the number of pulses and/or alterations of relative position between the rotor and stator and/or the determination of a group of coils to be energized, which are required for achieving the desired magnetization, initially or in any other occasion requiring magnetization of the magnets 20, with the rotor being mounted to the motor.

Between each magnetization step, the present process has an additional step of determining one of the conditions of relative position between at least one magnet 20 and a determined stator coil 40 and of magnetization reached by at least one of the magnetic sectors submitted to a magnetization in a previous step, before determining in a subsequent step, by altering at least one of the conditions of relative angular positioning before a new current pulse and of coil or coils 40 to be energized. After each modification of relative angular position and before a new current pulse, it can be further foreseen an additional step of restraining the rotary movements of the rotor in relation to the stator.

In the cases in which the rotor is mounted to a hermetic compressor, when a remagnetization of the magnets 20 of said motor is required, the rotor is rotatively retained to the stator 40, independently from knowing the rotor-stator relative position, for applying at least one current pulse.

The subsequent current pulses, if necessary, may be applied to other coils 40 other than those used before, or the coils 40 may be energized, but after a new angular positioning of the rotor in relation to the stator 30. The coils 40 to be used or the angle of movement to be followed depends on the specific project of the motor.

The magnetization of the magnets 20 of the rotor may be also obtained by simultaneously or consecutively applying a plurality of current pulses to different numbers of coils 40, each number of coils 40 being energized in order to generate a magnetic field of magnetization of at least a substantial part of a corresponding magnetic sector.

The external current source may be, for example, that already used in the art and which consists of a power source capable of supplying a current level necessary to produce a magnetic field, which is strong enough at the region of the motor where said magnets 20 are lodged. The characteristics of required current intensity and time duration of current pulse depend on various factors related to magnet type, geometry of the motor, etc.

In case the magnetization of each magnetic sector is partial, other current pulses should be applied.

The magnetization process of the present invention determines an alteration in the process steps for assembling the motor of a hermetic compressor.

As a function of the magnetization process of the present invention, the process for assembling the compressor motor includes, before the motor is mounted to the compressor shell and after the steps of: positioning the rotor in relation to the cylinder block; inserting and affixing the eccentric shaft of said motor into the rotor through a hole provided in the cylinder block; and positioning and affixing the stator in the cylinder block, in order to maintain a determined radial gap between the stator and the rotor, the steps of positioning the rotor in relation to the stator and promoting the controlled energization from an external current source, of at least one coil 40 of the stator 30, in order to promote the magnetization of the magnets 20.

With the solution of the present invention, besides the rotor being mounted to the motor without the magnetization of its magnets, thus avoiding the problems caused by magnetic attraction observed in the prior art, the present magnetization process eliminates the need of using a magnetizing means external to the rotor and uses the magnetic field generating characteristics of the motor itself.

The process of the present solution further allows to magnetize the magnets, already mounted to the rotor and having a determined degree of magnetization in at least Part of the body thereof (pre-magnetization), or to submit said magnets to a new magnetization, which may not be complete and homogeneous in all the magnets, provided that the worst magnetization condition results in a magnet having magnetization characteristics within acceptable parameters, in case it is not possible to have an optimum adjustment in the positioning of the rotor in relation to the stator. This may occur, for example, in the maintenance of compressor motors which may have the rotor re-magnetized in the place where said compressors are applied. The process allows to achieve the magnetization of all magnets 20 from a single current pulse or with partial magnetizations of the rotor magnets, further allowing the magnetization to be maximized with a minimum of current pulses and/or changes of relative positioning between the rotor and stator.

When a re-magnetization of the motors is required, as in hermetic compressor motors under operation, the magnetization may generate magnetic sectors, which are angularly offset in relation to the magnetic sectors initially established, each including at least part of at least one magnet 20. For this situation, a new magnetization will occur, by varying the coils 40 to be energized and the number of pulses produced, regardless of the relative positioning between the rotor and stator.

For hermetic compressors, the present invention has, besides the already mentioned advantages, the advantage of assuring an alignment between the magnetic fields of both the rotor and stator, avoiding the occurrence of forces over the bearing and the consequences of the wear caused by the unbalance between the eccentric shaft and the hole of the cylinder block in which said shaft is mounted and also between the piston and the cylinder in which said piston actuates. The present invention further avoids obstructions in the refrigeration circuit caused by loose particles, as it occurs in the prior art.

What is claimed is:

1. A process for magnetizing the permanent magnets of an electric motor rotor, having rotor magnetic sectors, each with a single and respective magnetic orientation and comprising at least one magnet (20), the stator (30) of said motor carrying a plurality of coils (40), characterized in that the process comprises the steps of:
   a- assembling the electric motor, by operationally positioning the stator (30) in relation to the rotor;
   b- positioning the rotor in a predetermined angular position in relation to the coils (40) of the stator (30);
   c- promoting the controlled energization, from an external current source, of at least one coil (40) of the stator (30), in order to promote a predetermined level of magnetization of a part of an angular section of at least one magnetic sector of the rotor in said predetermined angular position, said controlled energization being obtained from a provision of at least one current pulse generating respective magnetic fields inducing said magnetization; and
   d- repositioning the rotor in another predetermined angular position in relation to the coils (40) of the stator (30) for achieving, with the energization of at least one coil (40), the predetermined level of magnetization of at least one angular section which was not adequately magnetized in the step "c" of at least one magnetic sector.

2. Process, as in claim 1, further comprising the step of rotatively retaining the rotor in relation to the stator (30) in a determined angular position and in that, for applying each current pulse, the magnets (20) being magnetized occupy a respective angular position in relation to the coils (40) being energized.

3. Process, as in claim 2, characterized in that, between each step of retaining the rotor in relation to the stator (30), an additional step of determining at least one of positional relation between the rotor and the stator for the relative angular position between at least one magnet (20) and a determined coil (40) to be energized and of magnetizing at least one magnetic sector.

4. Process, in claim 3, characterized in that a maximization of the magnetization of at least a substantial part of each magnetic sector, by optimizing the rotor-stator angular positioning in relation to the production of current pulses is achieved.

5. Process, as in claim 4, characterized in that, before each current pulse, occurs the modification of at least one of the conditions of rotor angular position and of determining another assembly with at least one coil (40) to be energized.

6. Process, as in claim 5, characterized in that the steps of magnetizing at least one magnetic sector are obtained by varying at least one of the conditions of rotor angular position, number of current pulses applied to at least one coil (40) and number of coils (40) to be energized.

7. Process, as in claim 6, characterized in that the magnets (20) carried by the rotor are previously provided with a determined degree of magnetization in at least part thereof.

8. Process, as in claim 1, characterized in that, between each magnetizing step, the determination of at least one of the conditions of relative angular position between at least one magnet (20) and a determined coil (40) to be energized and of magnetizing at least one magnetic sector.

9. Process, as in claim 1, characterized in that the repositioning between the rotor and the stator (30) is obtained with an angular displacement of the rotor relative to the coil (40) of the stator (30) to be energized.

10. Process, as in claim 1, characterized in that the repositioning between the rotor and the stator (30) is obtained with the selection of at least another coil (40) of the stator (30) to be energized.

11. Process, as in claim 10, characterized in that the repositioning between the rotor and the stator (30) is also obtained with an angular displacement of the rotor relative to the coil (40) of the stator (30) to be energized.

12. A process for assembling a hermetic compressor motor, including a cylinder block bearing an eccentric shaft, to which is affixed a rotor carrying permanent magnets (20) and having rotor magnetic sectors, each with a single and respective magnetic orientation, and a stator (30) carrying a plurality of coils (40), characterized in that the process comprises the steps of:
   a- positioning the rotor carrying magnets (20) in relation to the cylinder block;
   b- inserting and affixing the eccentric shaft to the rotor through a hole in the cylinder block;
   c- positioning and affixing the stator in the cylinder block, in order to maintain a determined radial gap between the stator and the rotor;
   d- positioning, operationally, the rotor in a predetermined angular position in relation to the coils (40) of the stator (30);
   e- promoting the controlled energization, from an external current source, of at least one coil (40) of the stator (30), in order to promote a predetermined level of magnetization of a part of an angular section of at least one magnetic sector of the rotor in said predetermined angular position, said controlled energization being obtained from a provision of at least one current pulse generating respective magnetic fields inducing said magnetization;

f- repositioning the rotor in another predetermined angular position in relation to the stator (30) for achieving, with the energization of at least one coil (40), the predetermined level of magnetization of at least one angular section which was not adequately magnetized in the step "c" of at least one magnetic sector; and g- assembling the compressor motor in a hermetic shell thereof.

13. Process, as in claim 12, characterized in that the repositioning between the rotor and the stator (30) is obtained with an angular displacement of the rotor relative to the coil (40) of the stator (30) to be energized.

14. Process, as in claim 12, characterized in that the repositioning between the rotor and the stator (30) is obtained with the selection of at least another coil (40) of the stator (30) to be energized.

15. Process, as in claim 14, characterized in that the repositioning between the rotor and the stator (30) is also obtained with the an angular displacement of the rotor relative to the coil (40) of the stator (30) to be energized.

* * * * *